UNITED STATES PATENT OFFICE.

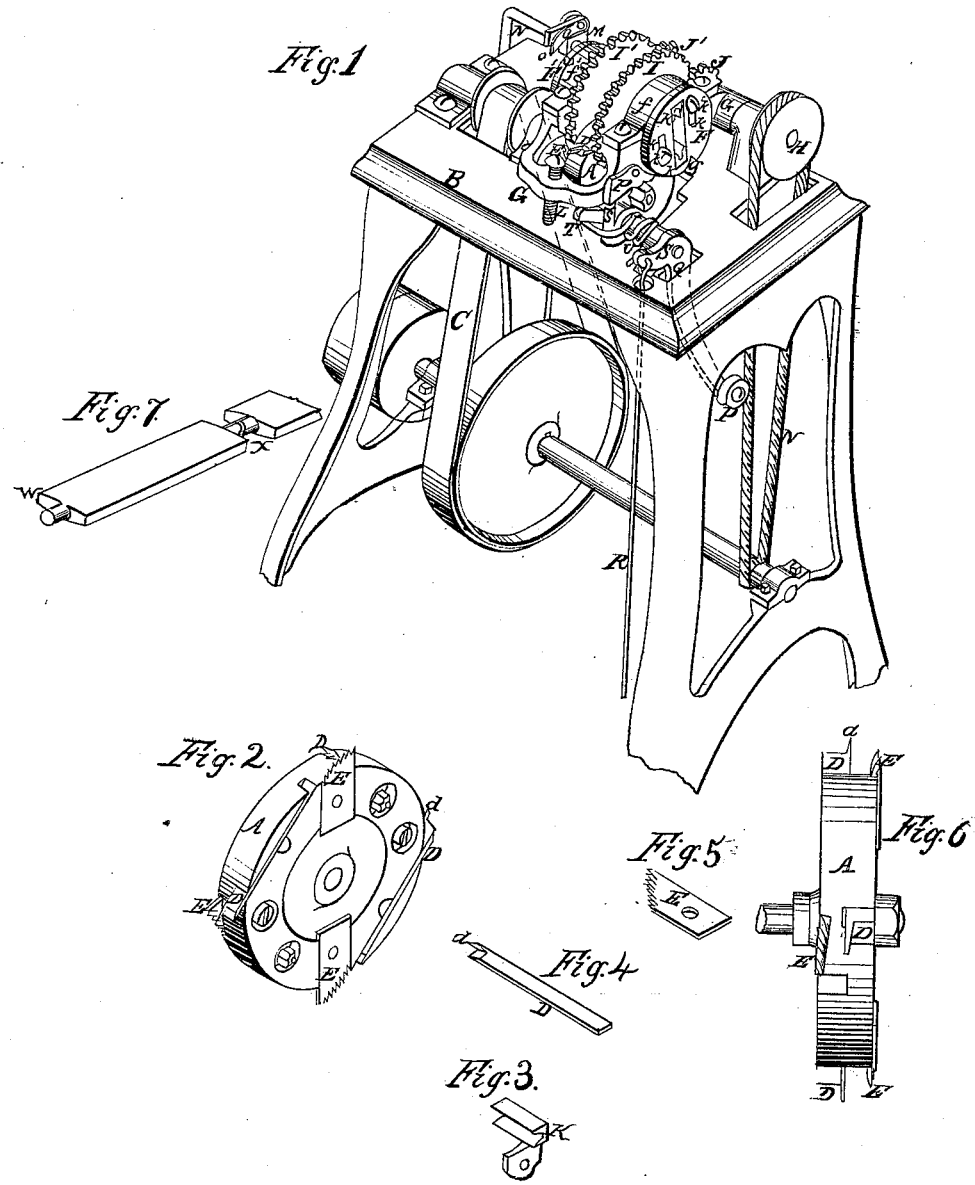

HENRY BICKFORD, OF CINCINNATI, OHIO.

*Letters Patent No. 89,277, dated April 27, 1869.*

IMPROVEMENT IN BLIND-SLAT-TENONING MACHINE.

The Schedule referred to in these Letters Patent and making part of the same.

*To all whom it may concern:*

Be it known that I, HENRY BICKFORD, of Cincinnati, Hamilton county, State of Ohio, have invented certain new and useful Improvements in Machines for Cutting the Tenons on the Ends of Slats for Window-Blinds, &c.; and I do hereby declare the following to be a sufficiently full, clear, and exact description thereof, to enable one skilled in the art to which my invention appertains, to make and use it, reference being had to the accompanying drawings, making part of this specification.

My invention consists of the following devices:

First, in the peculiar construction and arrangement of revolving chucks, in which the slat or slats are secured.

Second, in the combination and arrangement of a weighted pawl, and tightening device, for the driving-belt of the revolving chucks, which act simultaneously, to stop the chucks and slat, and slack the driving-belt, so that the slat may be adjusted previous to the cutting of a tenon, and also act simultaneously to release the chucks, so that they are free to rotate, and tighten the driving-belt.

Third, in the peculiar construction of the revolving cutter-head and cutters, by which two tenons can be cut and divided, with one cutter-head, and at one operation.

Fourth, in the provision, in the cutter-head, of knives, so constructed and arranged that they will form the ends of the slats bevelling.

Fifth, in the provision of a spring-gauge, for regulating the length of the slats.

In the accompanying drawings—

Figure 1 is a perspective view of a machine embodying my invention.

Figure 2 is a detached perspective view of the cutter-head.

Figure 3 is a detached view of one of the clamps of the chuck.

Figure 4 is a view of one of the tenoning and separating-knives.

Figure 5 is a view of one of the bevelling-knives.

Figure 6 is a plan of the cutter-head detached.

Figure 7 is a view of one complete tenoned slat, and part of another, showing the character of the double tenon cut, which forms a tenon on one end each of two slats.

A is the cutter-head of the machine, which is journalled in the frame B, and driven by belt C.

Each side of the head is provided with tenoning-cutters D, which have barbs $d$ formed upon them.

In the operation of the machine, the cutter-head, at one operation, completes the cut, as seen at X, fig. 7, the barbs $d$ separating the tenon in the manner shown.

The cutter-head is also provided with bevelling-cutters E, which are formed each with a number of serrations, of varying projection, to admit of the cutters being adjusted to present an inclined edge to the work, so as to cut the slats bevelling on the ends.

The tenoned slats are used for "inside blinds," where they are arranged to vibrate to open and close; and the object of the bevel end is, that the slat may bear against the frame, at a point near the tenon, in order that it may not scrape off the paint of the frame in its vibration. Heretofore, the slats have been cut square on the end.

F F' are chucks, within which the slats are inserted. These chucks rotate in complete journal-boxes $f f'$, in the frame G.

The frame G swings on the shaft H, in order that the work may be brought to and from the cutter-head.

The chucks are driven simultaneously, through wheels I, by pinions J J', which are rigidly secured to shaft H, and are provided with sliding jaws K, which are capable of adjustment by means of slots $k$ and set-screws $k'$, to fit all sizes of slats.

L is a gauge-screw, which regulates the depth of cut.

M is an adjustable gauge, fitted to slide on rod N, and provided with a small spring, O, which has a curved lip, $o$, on its lower side.

This gauge regulates the length of slat, the shoulder W being pressed against it as the stuff is fed through the chucks endwise.

When the frame G is depressed, to enable the cutter-head to form the tenon, the lip $o$ of the spring O, forces the gauge off the shoulder W, fig. 7, and the stuff can be fed forward for the next cut.

P is a weighted pawl, designed to engage in the notch $g$ of the chuck F.

Q is a bell-crank, which carries a belt-tightening pulley, $p$, on one end, and is connected to a treadle-rod, R, at the other.

This bell-crank is secured to a shaft, S, journalled in the frame B, the shaft also carrying an arm, T, on the opposite end.

A spiral spring, U, serves to keep the treadle in the elevated position.

When the frame G and slat-stuff are depressed, for the purpose of cutting the tenon, the pawl P is released from the notch $g$, by striking against the projection $s$, and, at the same time, the belt V is tightened by pulley $p$, sufficient to forcibly rotate the chucks and slat.

When the frame G is raised, so that the stuff can be fed for the next cut, the pawl P engages in the notch $g$, and the chucks are stopped, in order that the stuff may be fed by hand, and, at the same time, the driving-belt V is slackened, to slip, and not drive.

I claim herein as new, and of my invention—

1. In combination with the rotating chucks F F', through which the material is fed endwise, the sliding adjustable jaws K, constructed and operating as described, and for the purpose set forth.

2. The weighted pawl P and bell-crank Q, arranged and operated in the manner and for the purpose specified.

3. The cutter-head A D d, constructed and operated as described, and for the purpose of cutting a double and divided tenon, as set forth.

4. The bevelled spurs E, constructed substantially as described, and for the purpose set forth.

5. The adjustable gauge M O o, for the purpose set forth.

In testimony of which invention I hereunto set my hand.

H. BICKFORD.

Witnesses:
THEO. H. JAMES,
EUGENE TRUMP.